United States Patent [19]

Dow

[11] 4,347,621
[45] * Aug. 31, 1982

[54] TROCHOIDAL NUCLEAR FUSION REACTOR

[75] Inventor: William G. Dow, Ann Arbor, Mich.

[73] Assignee: Environmental Institute of Michigan, Ann Arbor, Mich.

[*] Notice: The portion of the term of this patent subsequent to Jan. 13, 1998, has been disclaimed.

[21] Appl. No.: 156,034

[22] Filed: Jun. 3, 1980

Related U.S. Application Data

[63] Continuation-in-part of Ser. No. 845,325, Oct. 25, 1977.

[51] Int. Cl.³ .............................................. G21B 1/00
[52] U.S. Cl. ................................... 376/139; 376/127; 376/146; 376/141
[58] Field of Search ........................ 176/1, 3, 5, 7, 9; 376/121, 139, 127, 141, 146

[56] References Cited

U.S. PATENT DOCUMENTS

| | | | |
|---|---|---|---|
| 2,961,558 | 11/1960 | Luce et al. | 176/2 |
| 3,029,196 | 4/1962 | Baker et al. | 176/3 |
| 3,120,475 | 2/1964 | Bennett et al. | 176/2 |
| 3,501,376 | 3/1970 | Dow et al. | 176/5 |
| 4,065,351 | 12/1977 | Jassby et al. | 176/5 |
| 4,244,782 | 1/1981 | Dow | 176/3 |

*Primary Examiner*—Sal Cangialosi
*Attorney, Agent, or Firm*—Beaman & Beaman

[57] ABSTRACT

The invention pertains to the method and apparatus for the confining of a stream of fusible positive ions at values of density and high average kinetic energy, primarily of tightly looping motions, to produce nuclear fusion at a useful rate; more or less intimately mixed with the fusible ions will be lower-energy electrons at about equal density, introduced solely for the purpose of neutralizing the positive space charge of the ions. Ions under high kinetic energy are introduced into an annular reaction chamber having a primarily axial strong magnetic field and an essentially radial electric field and assume in the chamber a quasi-trochoidal motion in which the kinetic energies in their small diameter looping components of motion are greater by at least an order of magnitude, than the kinetic energies in the relatively slow crossed field advance motions with which the ions circulate circumferentially around the axis of the annular reaction chamber.

8 Claims, 10 Drawing Figures

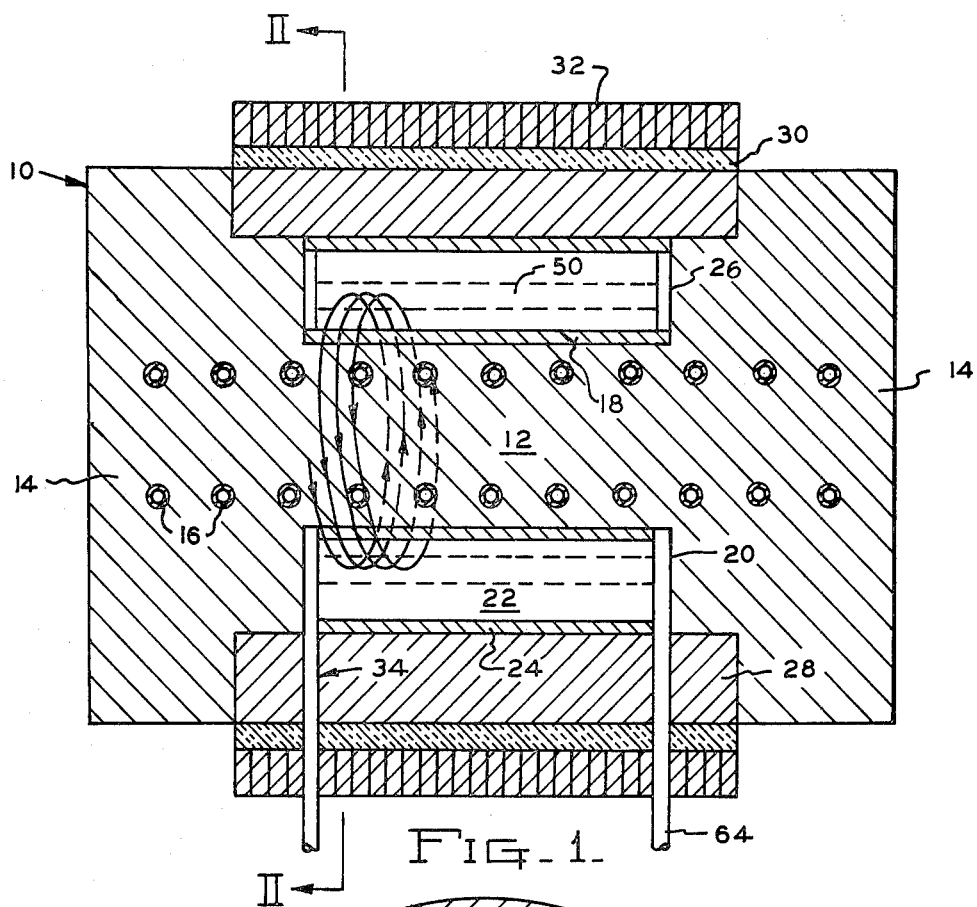
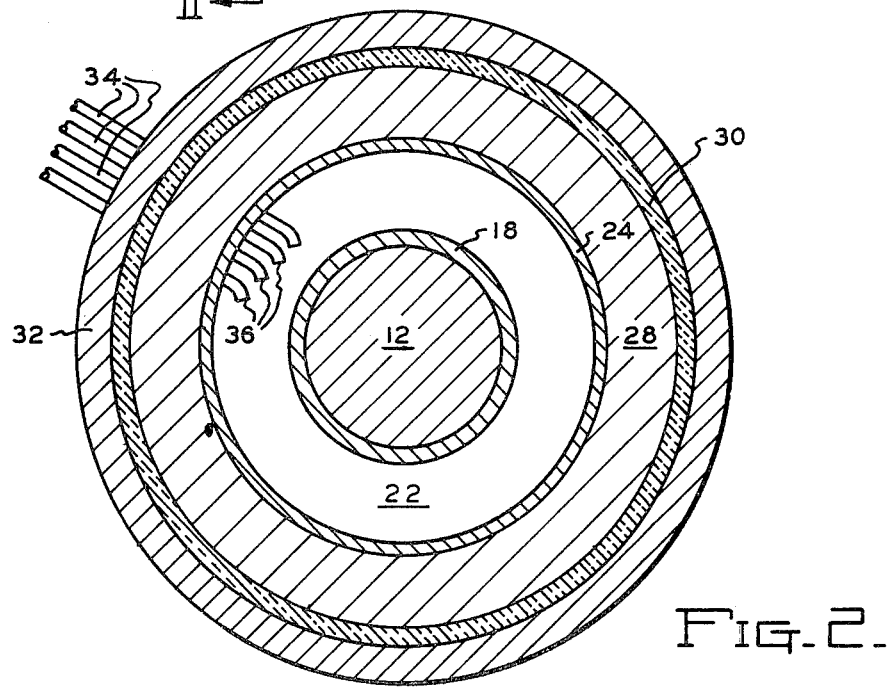

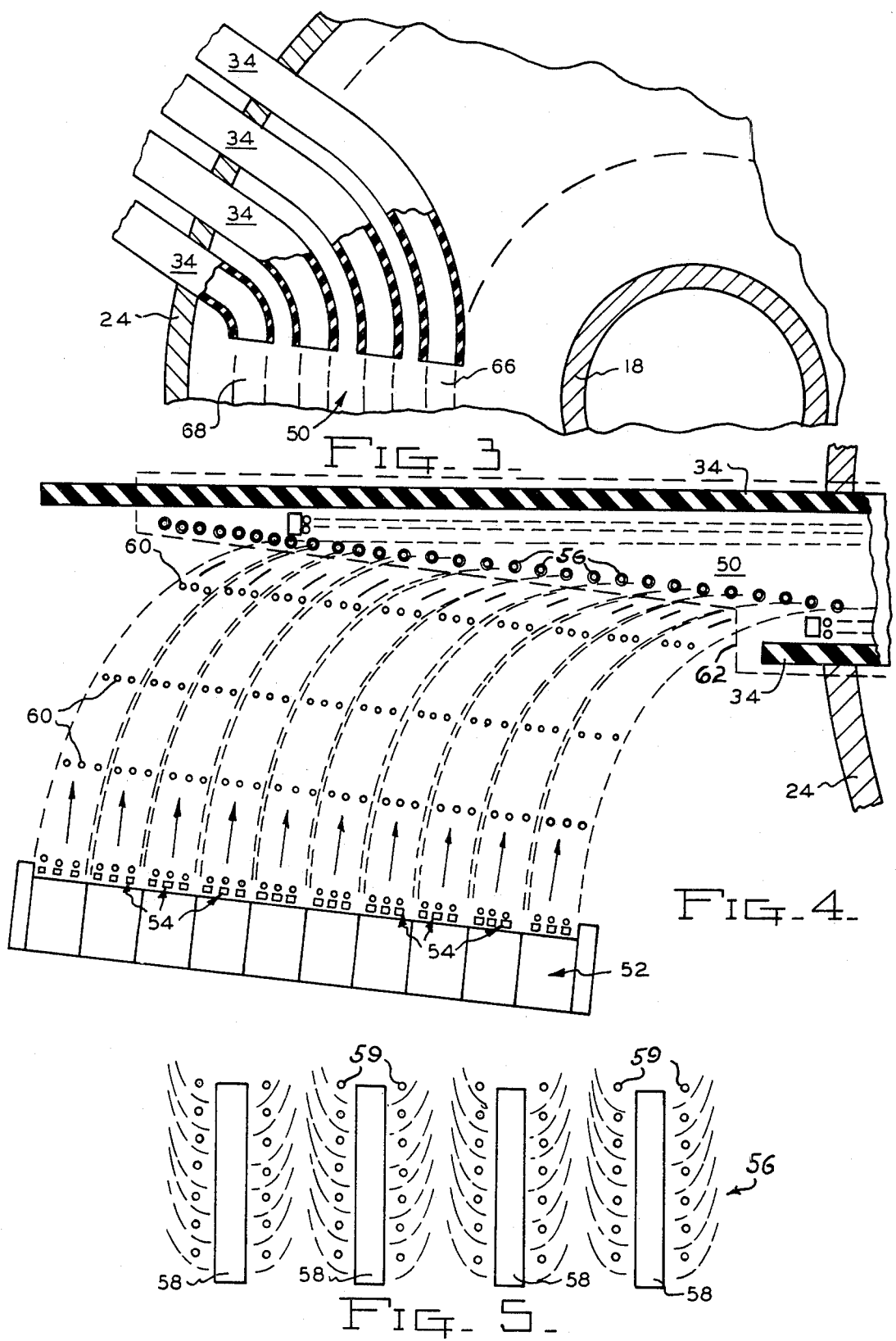

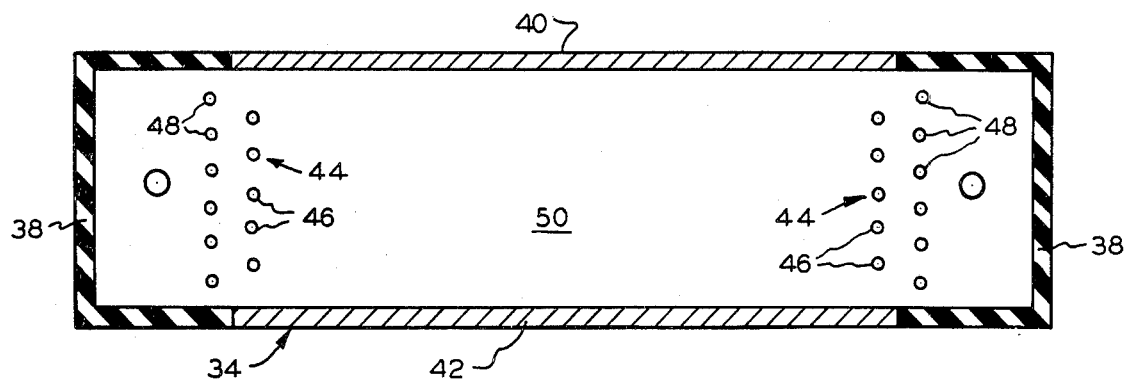
FIG_ 6_
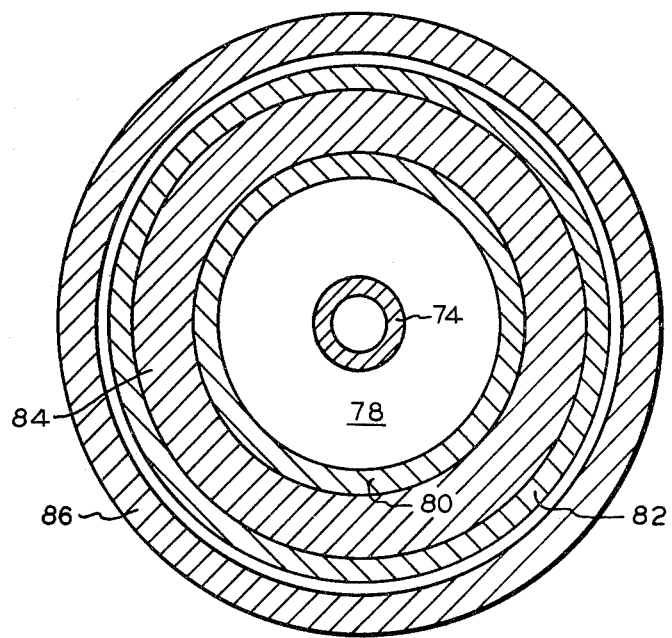
FIG_ 8_

TROCHOIDAL NUCLEAR FUSION REACTOR

RELATED APPLICATION

This application is a continuation-in-part of my co-pending application Ser. No. 845,325 filed Oct. 25, 1977.

BACKGROUND OF THE INVENTION

In the system of the invention a strong applied electric field is crossed with (i.e., established essentially at right angles to) a very strong annular-confinement magnetic field directed axially within an annular confinement chamber, and a stream or several streams of high-kinetic-energy tightly-looping fusible ions mixed with space-charge-neutralizing electrons is by ion and electron optical methods introduced into the chamber at a location within but non-adjacent to the walls of the annular chamber, the stream having appropriate values of electric potential and potential gradient and cross-sectional dimensions, these being controlled by circumstances of the introduction of the stream into the chamber, whereby the ions and space-charge-neutralizing electrons will move generally arcuately at right angles to both field directions at a crossed-field advance velocity determined by the electric field and the magnetic flux density thus being approximately at right angles to the annular axis of the chamber. The ions of the stream, because of the strength of the magnetic field, assume a confined tightly-looping quasi-trochoidal type of motion, or motion segments, with the kinetic energy in the small diameter looping components of the ion motions greatly exceeding the kinetic energy in the relatively slow crossed-field advance motion. The duration of the confinement into controlled flow paths is made sufficient to produce fusion events at a substantial rate resulting in the release of high kinetic energy neutrons and positively-charged particles whereby this kinetic energy may be converted into usable heat, chemical energy or directly converted into electric energy. The method and apparatus of the invention utilize crossed strong electric and magnetic fields to control the location, dimensions, and flow of the stream, and by the use of interrelated potentials impressed upon the stream as related to potentials within the location in the fusion chamber at which the stream is introduced maintains the stream out of contact with the chamber walls. Because the ion energies and densities are controlled by the circumstances of their introduction into the fusion chamber, they can in combination be large enough so that throughout the duration of the ions' flight paths within the fusion chamber, a duration that is controllable, the fusion power generation per unit volume of stream can be great enough so that substantial power generation can be obtained in a relatively small volume of the reacting stream.

The invention pertains to a system for producing nuclear fusion, and particularly relates to the confinement, that is, to the control of the location, dimensions, potential structure, and flow rate, of a stream of fusible positive ions, with associated separately produced electrons that are present solely to neutralize the ion space charge, such control being by the use of crossed electric and magnetic fields having directions wholly or primarily at right angles to one another.

The high kinetic energy ions introduced into the annular reaction chamber assume a looping quasi-trochoidal type of motion. This motion is characterized in the invention by the kinetic energies in the small diameter looping components of the ion motions exceeding, by a factor of the order of 10 or more, and extending in cases to factors of thousands or tens of thousands or more, the kinetic energies in the relatively slow crossed-field-advance motions with which the ions circulate circumferentially around the axis of the annular reaction chamber.

While the advantages of producing energy, in the form of heat or electricity, through the nuclear fusion process has long been appreciated, because of the very high kinetic energies (often expressed in terms of extremely high temperatures) at which fusion occurs, and because of other physical limitations, it has not been possible to bring about adequate confinement or control and so utilize nuclear fusion principles in a commercial manner.

It has been recognized that nuclear fusion reactions can be confined within magnetic fields, and fusible fuel which has been completely ionized to form an assembly of positive ions and free electrons, often called a plasma, has been proposed to be confined within crossed electric and magnetic fields as disclosed in U.S. Pat. No. 3,029,199. In that patent the magnetic flux lines loop around the interior axis of the annular chamber, the ion and electron stream therefore circulating generally parallel to that interior axis, occupying only a very limited portion of the available magnetic field region. Furthermore, in U.S. Pat. No. 3,029,199 the ionization and imparting of kinetic energy to the ions is the result of passage of electric current between the electrodes of the chamber, thus establishing a plasma, a method that has not been used successfully to produce the ion kinetic energy needed for fusion.

In U.S. Pat. No. 3,120,475 there is disclosed an electric mirror machine that employs electrodes at differing potentials in combination with a magnetic field. Its primary high density, high energy confined flow occurs parallel to the axis of the magnetic field and for the most part parallel to a congruent electric field, the magnetic and electric fields being almost entirely congruent in the important region where the charged particles are reflected from their approach to the two ends of the enclosure. In this patent the primary purpose of the electric field is to cause reflections of the ions back and forth from and between the two on-axis ends of the enclosure in their movements essentially parallel to the magnetic flux lines and two positive repelling electrodes are required on the convergent end sections; to cause the repelling field to exist there must be a strongly negative electrode elsewhere, this being the electrode centered on the meridian plane extending parallel to the axis along the inner surface of the central portion of the enclosure, which must be remote from the active playing region where the plasma exists in order not to interfere with it either physically or by electric field influences. Thus two electrodes, both positive, are at the extreme ends and near the axis of the structure, whereas the negative electrode centers in the central plane of the structure and is remote from the axis. U.S. Pat. No. 3,120,475 employs ion injection from a simple ion gun, a method that is not feasible with magnetic flux densities strong enough to provide confinement at ion densities and energies needed for fusion.

In my U.S. Pat. No. 3,501,376 I disclose a method and apparatus for confining a monopolar (i.e., using ions alone) stream of fusible ions by using crossed electric and magnetic fields. However, the prior art disclosures have not been sufficient to overcome the many problems in creating and maintaining a commercially usable fusion reaction, and one of the problems results from the inability of known apparatus to maintain the confinement of fusible positive ions at a sufficient combination of high kinetic energy and high density to permit a sufficient rate of neutron and positively-charged particle production.

In the majority of existing proposed engineering applications for fully ionized gases, whether for fusion or other purposes, the presence of a magnetic field, usually an extremely strong magnetic field, is an essential item. In many of the related analytical treatments and engineering studies great emphasis is placed on the powerful magnetic influences that prevent the "guiding centers" of the charged particles' motions from moving across magnetic flux lines from one "tube of flux" to another. The guiding center concept arises from the fact that in a strong magnetic field a charged particle's motion consists of a small diameter circular looping in the plane at right angles to the magnetic field direction, superimposed on certain kinds of straight line or slowly curving motions. It is helpful to consider the straight line or slowly curving motions as being translations of the guiding centers of the loop, no physical object being at a "guiding center," with the looping motion as a whole translating as movements of the guiding center require, the looping component remaining parallel to its original plane. In the absence of any electric field, the guiding center can move only in one direction, i.e., that of the magnetic field, to or fro. This is a very strong limitation, particularly for the nuclear fusion reaction art wherein the magnetic field may often be strong enough so that even for very large kinetic energies of the ions the diameter of their looping motions is only a very few centimeters, or even a very few millimeters, and therefore in many cases small relative to the dimensions of the fusion-reaction chamber. This powerful tendency for confinement of the guiding center to its original position in the magnetic-flux structure is described in terms of "magnetic pressure", which is proportional to the square of the magnetic flux density. Closely related to this behavior is the fact that the magnetic force on a charged particle does not add to nor subtract from its kinetic energy, because the magnetic force is always at right angles to the direction of the particle's motion, so does not affect its scalar velocity, nor its kinetic energy. In a converging magnetic field translation of the guiding center in the direction of the magnetic field will alter the division of the kinetic energy as between the looping motion energy content and the translational motion energy content. This happens in the familiar magnetic mirror machine intended to produce fusion, being a behavior wholly different in principle from that occurring in the electric mirror apparatus of U.S. Pat. No. 3,120,475 referred to earlier.

However, in the presence of an electric field that has its major component at right angles to the direction of the magnetic field, there is a very powerful influence that compels the guiding centers to move across magnetic flux lines, in a direction at right angles to both the electric and the magnetic fields, thus producing the straight line or slowly curving component of motion referred to earlier. Under these conditions the resulting movement has as one component what is called the "crossed-field advance velocity" in the prescribed direction. Electromagnetic theory, and also simple rule-of-thumb considerations, require that for the straight line crossed-field advance velocity existing when both fields are uniform, this velocity expressed in meters per second must equal the cross direction electric field component in volts per meter divided by the magnetic flux density in webers per square meter. This crossed-field advance velocity is the same in direction and magnitude for particles of the two kinds of electric charge, and is independent of the mass of the particle and the amount of its electric charge, and is therefore the same for the electrons as for the positive ions. The direction of the looping component superimposed on the crossed-field advance velocity is clockwise for one kind of particle, and is counterclockwise for the other. The radius of the looping component is inversely proportional to the magnetic flux density, proportional to the square root of the kinetic energy content of the looping component of the motion, and proportional to the square root of the mass of the particle. Because of the dependence on particle mass, the radius of the electron looping is for given kinetic energy very much smaller than for the ions, for example by a factor of about 60 for deuterons; in addition, for the embodiments envisioned for this invention the electron energies are expected to be substantially less than the ion energies.

For any charged particle so moving, the total average kinetic energy is the simple sum of three energies; that in the crossed-field advance motion, that in the circular looping motion superimposed on the advance motion, and that in the linear motion parallel to the direction of the magnetic field. For each particle the angular velocity in radians per second is invariant, being numerically the same as the cyclotron radian frequency governed by the magnetic flux density and the ratio of electric charge to mass for the particle. Even in the presence of extensive occurrence of collisions between particles, every individual segment of a particle's motion will have the crossed-field advance velocity as a component of its motion in the prescribed direction; thus a swarm of particles having many collisions will move as a body with the crossed-field-advance direction and magnitude. When tightly-looping high-kinetic-energy particle motions appear in the presence of curvature and convergence of the crossed fields, but with the loops being small enough so that there occur only very minor changes in field directions or intensities within individual loops, the crossed-field advance concept applies for the motions of the guiding centers, with however, a centrifugal force effect contributing to the governing of the magnitude of the crossed-field advance velocity; however, this velocity's direction remains always at right angles to both fields. In the embodiments of my invention these centrifugal force effects will contribute only to a very small degree to the governing of the magnitude of the crossed-field advance velocity of the guiding centers.

This requirement for the existence of the crossed-field advance velocity of the guiding centers is potentially a very powerful resource for compelling streams of charged particles, of ions or electrons or both intermixed, to move across magnetic flux lines in prescribed paths, and this can include movement from outside to inside of a region of very strong magnetic field, as for example into a region in which the very strong magnetic field confines a fully ionized gas at energies adequate to cause fusion. It is also a resource that can be used to compel streams of such particles to circulate in crossed-field advance paths, and at controlled rates of advance, within a crossed-field fusion reaction chamber, but this resource has not been utilized to its potential in the prior art devices.

SUMMARY OF THE INVENTION

It is an object of the invention to provide method and apparatus for producing and confining, i.e., keeping together and controlling the location and dimensions of, a stream of fusionable ions and space-charge-neutralizing electrons at ion density and ion kinetic energy adequate to produce a fusion reaction, wherein the stream of ions and electrons is confined within one or more annular chambers having strong magnetic fields imposed thereon, the electric field being essentially at right angles to the direction of the magnetic field, and the magnetic and electric fields and the suitably established electric potentials thereof producing a tightly looping slow forward motion of the stream particles, the tightly looping motions being in planes at right angles to the magnetic field and the slow forward motion being in the direction at right angles to both the magnetic field and the electric field, and the chamber being surrounded by a neutron-absorbing material for utilizing the heat and other energy resulting from the stopping therein of the high kinetic energy neutrons and charged particles resulting from the fusion, and for protecting the current carrying main coil that produces the strong magnetic field from being damaged by passage of such neutrons and charged particles into and through that coil.

A further object of the invention is to provide a method for producing and confining a stream of fusible ions of a density and kinetic energy that will produce a nuclear fusion reaction wherein the stream is confined within crossed magnetic and electric fields and the reaction chamber is of an annular configuration and the ions of the stream assume a tightly looping quasi-trochoidal slow forward motion, the forward motion being at right angles to both the electric and the magnetic fields, the stream of ions being introduced into the annular chamber at potentials and with potential gradient corresponding to the potentials and potential gradient of the electric field in the reaction chamber at the location of the stream entry into the chamber, so providing proper initiation of the slow forward motion of the charged particles at right angles to the applied magnetic and electric fields.

A further object of the invention is to provide a method for producing and confining a stream of fusible ions and space-charge-neutralizing electrons of a density and ion energy that will produce a nuclear fusion reaction wherein the stream is confined within crossed electric and magnetic fields and the reaction chamber is of an annular configuration and the ions of the stream assume a tightly-looping quasi-trochoidal slow forward motion, the forward motion being at right angles to both the electric and the magnetic fields, the stream of ions and space-charge-neutralizing electrons being introduced into the annular chamber at potentials and with potential gradient corresponding to the potentials and potential gradient of the electric field in the reaction chamber at the location of the stream entry into the chamber, so providing proper initiation of the slow forward motion of the charged particles at right angles to the applied magnetic and electric fields.

An additional feature of the invention is to provide apparatus for confining and maintaining a nuclear fusion reaction wherein the confinement of the fusible ions occurs within an annular chamber subjected to crossed electric and magnetic fields, and means are provided for introducing a stream of fusionable ions and space-charge-neutralizing electrons into the chamber at potentials and potential gradient suitably related to the potentials and potential gradient of the chamber location at which the ions and electrons are introduced.

A further object of this invention is to provide means for introducing streams of electrons alone, of controlled total charge content, that will circulate in paths at right angles to the applied electric and magnetic fields in the annular reaction chamber, this circulation being parallel to the circulation of the mixed stream of fusible ions and space-charge neutralizing electrons, these streams of electrons alone being located by circumstances of their introduction either essentially adjacent to but outside of the boundaries of the mixed ion and electron stream or at some distance from those boundaries, being between those boundaries and the annular walls of the fusion reaction chamber; such streams will originate at the point of introduction of the mixed ion and electron stream into the reaction chamber, and may be placed to provide such streams on either or both sides of the mixed stream, between the mixed stream and the enclosing electrode walls, details of location to be such as may be found most advantageous; these streams will serve to aid in controlling the potential gradient in the applied electric field direction within the mixed ion and electron stream, thus aiding in governing the rate of crossed-field advance circulation of the mixed stream at right angles to the applied electric and magnetic fields.

A further object of the invention is to provide apparatus confining a nuclear fusion reaction wherein an annular chamber is utilized, the chamber being defined by inner and outer tubular electrodes across which the electric field is produced, and the chamber is surrounded by a magnetic field producing electric coil, and material for absorbing neutrons and high kinetic energy charged particles resulting from the fusion reaction circumscribe the chamber inwardly of the magnetic coil structure.

Yet another object of the invention is to provide apparatus for confining and controlling a stream of fusible ions and space-charge neutralizing electrons while being transferred to a fusion reaction chamber, or between reaction chambers.

Another object of the invention is to provide apparatus for confining and controlling a stream of fusible ions and space-charge neutralizing electrons while being transferred to a fusion reaction chamber, or between reaction chambers, by having the mixed ion and electron streams move at the crossed-field advance velocity along channels in which crossed electric and magnetic fields exist, the cross electric field being produced by a potential difference being maintained between two electrically conducting faces of the channel, with a magnetic field being established at right angles to this electric field and to the direction of advance of the charged particles along the channel.

An additional object of the invention is to provide apparatus for confining and controlling a stream of fusible ions and space-charge neutralizing electrons while being transferred to a reaction chamber, or between chambers, by having the mixed ion and electron stream move at the crossed-field advance velocity along channels in which crossed electric and magnetic fields have been established, the cross electric field being maintained between two electrically conducting faces of the channel, with a magnetic field being established at right angles to the electric field and to the direction of advance of the charged particles along the channel, and with "end hat" systems of electrodes at suitable polarities and voltages across the faces of the channel through which the magnetic flux lines pass, one set of electrodes, i.e., rods or wires parallel to one another and at right angles to the applied electric field direction, having suitably determined potentials positive to the nearest stream portion, to repel back into the stream ions whose random motions parallel to magnetic flux lines may tend to make them move out of the channel along the flux lines; the other set of similar electrodes, slightly displaced in the magnetic field direction from the first set being at a suitably determined negative potential to repel electrons whose random motions may make them tend to move out along magnetic flux lines; the set of such electrodes that is nearer to the mixed ion and electron stream is a grid or otherwise penetrable structure to allow the particles not repelled by it to pass on through it to be in turn repelled by the other set of electrodes. Within each of the two sets the potentials of the individual rods or wires are varied from high potential to low potential to make there exist across the end of the channel through which the magnetic flux lines pass a potential gradient corresponding to the potential gradient in the mixed ion and electron stream that is advancing along the channel.

A further object of the invention is to provide apparatus for confining and controlling a stream of ions and space-charge neutralizing electrons while being transferred to an annular chamber such as a fusion reaction chamber, or between chambers, by having the mixed ion and electron streams move at the crossed-field advance velocity along channels in which crossed electric and magnetic fields exist, the cross electric field being produced by a potential difference being maintained between two electrically conducting faces of the channel, with a magnetic field being established at right angles to this electric field and to the direction of advance of charged particles along the channel, and including means for maintaining present streams of electrons alone, of controlled total charge content, that advance at the crossed-field advance velocity at right angles to the applied electric and magnetic fields in these channels, this movement being parallel to the movement along the channel of the mixed streams of ions and space-charge neutralizing electrons, these streams of electrons alone being located by circumstances of their introduction either essentially adjacent to but outside of the boundaries of the mixed ion and electron streams, or at some little distance from those boundaries but between them and the electrically conducting faces of the channels; such streams will originate at the point of introduction of the mixed stream into the channel, details of the location between the mixed stream and the wall being such as will be found most advantageous; such streams of electrons alone may be maintained in either or both of the regions between the mixed stream and the two electrically conducting walls of the channel; these streams will serve to aid in controlling the potential gradient in the applied electric field direction within the channel, thus aiding in governing the rate of crossed-field advance of the mixed ion and electron stream along the transfer channel.

Yet another object of the invention is to provide apparatus for confining and maintaining a stream of fusible ions and space-charge neutralizing electrons within a pair of annular reaction chambers subjected to strong crossed electric and magnetic fields. The ions and electrons move in a confined tightly looping quasitrochoidal slow motion at right angles to both fields, with slow travel through the chamber, and upon reaching the end of one of the reaction chambers being transferred to a concentric annular reaction chamber for travel in the opposite axial direction, and upon reaching the end of the second chamber being reintroduced into the first chamber whereby a continuous recirculation of the stream is possible producing a duration of reaction and energy and density of ions to efficiently produce fusion events.

A further object of the invention is the inclusion of methods both of continuous operation of the apparatus, that is, steady-state operation over long periods of time, and alternatively of intermittent operation for successive short-duration periods, with waiting or low-level operation periods in between. Reasons for this can include the need for cooling of equipment and for disposition of bursts of rapid releases of fusion energy. Included is the possibility in operation of using short period introduction of specially designed magnetic field configurations, also possible use of a changing magnetic field that will by transformer action generate electron currents in the streams in directions parallel to the main magnetic field, as for example to modify the magnetic field within the reaction regions.

In the practice of the invention a fusion reaction chamber is of an annular configuration, with however the two tubular electrodes bounding the annular region not necessarily circular in section, although the shapes of the cross-section of the tubular electrodes must be arcuate without sharp corners, thus possibly being oval or two semi-ovals open into one another beyond the mid-sections of their long dimensions; the length dimension of the tubular electrodes may be linear in form, or may be arcuate. The inner diameter of the chamber is defined by a tubular electrode if the section is circular, and an outer electrode is radially aligned with the inner electrode and in spaced relationship thereto whereby a reaction chamber is defined between the electrodes, and except for the introduction of the stream of charged particles an extremely high vacuum is maintained within the reaction chamber or chambers and within stream transfer channels into and between chambers. A material having a high neutron absorption characteristic, such as gadolinium or lithium or a compound of lithium surrounds the outer electrode, and there are included there circulating means whereby the heat absorbed by the neutron absorbing substance as it absorbs the neutrons and other high kinetic energy particles may be removed for utilization. A coil surrounds the neutron absorbing material in radial alignment with the fusion chamber, and the purpose of the coil is to produce a strong magnetic field throughout the chamber.

The inner and outer electrodes are energized with opposite potentials wherein a strong electric field, in addition to the magnetic field, exists within the reaction chamber, and as the fields are at right angles to each other a movement of the stream of fusible ions and electrons occurs in a circumferential direction around the axis common to the two electrodes bounding the reaction chamber; a small circumferential component of the magnetic field, around that axis, is provided as by currents along the electrodes or auxiliary coils; and this causes the motion of advance at right angles to both the electric and magnetic fields to become that of a short pitch helix, so that very slow travel occurs in a direction parallel to the helical axis, that is, the electrode system axis, along the long dimension of the chamber.

A stream of fusible ions and negative space charge carrying electron streams, are separately formed exteriorly of the reaction chamber, intermixed, and introduced into the chamber at values of electric potential and potential gradient related to the potential and potential gradient within the chamber at the location of stream introduction; the passage of the mixed stream from the exterior to within the reaction chamber, involving movement of charged particles across magnetic flux lines, is accomplished by channels in which the crossed-field advance is caused by the proper maintaining of crossed electric and magnetic fields within the channels; in this manner confinement and control of the stream is initiated and facilitated.

In an embodiment of the invention a pair of concentrically related tubular inner and outer electrodes is utilized defining concentric annular reaction chambers, and at the ends of the chambers crossed-field transfer channels are provided whereby the circulating streams of ions and electrons may be transferred from one chamber to the other as the ends of the channels are engaged by the particles in their travel that occurs slowly in the axial directions of the helical or curved axis helical nature of their circulation in the reaction chambers. The combination of electric potentials and circumferential component of the magnetic field is such that the particle travel movement within the reaction chambers in the axial direction is in the opposite direction within the other chamber such that a continuous recirculation of the ions and electrons may take place. In this embodiment crossed-field transfer channels are provided, with controls as to flow passage in them, for introducing and removing the streams of ions and electrons, thus controlling the duration of confinement for an average number of particles; in this manner the densities and kinetic energies of the ions in the stream may be controlled.

Upon removal of a stream or stream portion from the reaction chamber via an exit channel, the kinetic energy remaining in the removed ions is extracted by a combination of means involving putting the energy primarily into the crossed-field advance velocity rather than looping motion, by control of magnitudes of crossed fields, then employing one or another kinds of magnetohydrodynamic means to convert a substantial part of the energy directly into electrical form. Such treatment adds to the efficiency of the total energy conversion, but is not an essential item in my invention.

Within ion streams in accord with the invention the directions and magnitudes of the local crossed-field advance velocities of the guiding centers are governed by the total electric field and potential structure. This total field structure exists as the superposition of the local contributions to the field due to the space charge of space-charge waves that will exist in the streams, on the applied electric field as it would be in the absence of space charge, with account taken also of space-charge sheaths that may exist at stream edges either by design of the stream-introduction system or from imbalances in the boundary terminations of the space-charge waves.

In assemblies of charged particles nature prefers ordered vibratory systems as compared to non-ordered or random motions; the space-charge waves that comprise the ordered vibratory systems may be expected to consist of ordered and advancing arrays of potential hills and valleys in the streams, due to ordered non-uniform positioning of the ions with their positive charges and electrons with negative charges. These may be very high-potential variations; the crossed-field-advance paths of the guiding centers within the streams will lie along contours of such potential hills and valleys, which may impel the guiding centers back and forth across the stream in directions parallel to the applied electric field, such motion being superimposed on the gross aspect crossed-field advance of the stream as a whole.

The kinds of electric-circuit environments envisioned here for crossed-field transport, confinement, and control of fully-ionized gases, and in particular the electrodes that are adjacent to the stream parts of the electric circuit, will not be spatially periodic, and will therefore not support an electromagnetic field coupling between the space-charge waves and the circuit. In the absence of such coupling, space-charge waves terminate at the stream boundaries, as is true for space-charge waves in plasmas and in electron beams similarly not coupled to circuits. Therefore in the regions outside the streams, that is, between the controlled by design stream locations and the electrode surfaces, the effects of the applied electric field can be made to dominate, thus not permitting charge transport to the electrode boundaries. The average potential gradient in a stream can be strongly affected by the presence of net positive or negative layers of charge along the inner and outer stream faces, and by streams of electrons alone, if present, between the stream and the electrodes bounding the annular region in which the stream exists. Such charge layers along the stream surfaces, and streams of electrons, can in principle be established by design arrangements at the points of stream injection into transport or into circulation.

In regard to the formation by natural forces of charge layers along the surfaces of the mixed ion and electron streams, my invention envisions the use of streams in which the magnetic flux density is strong enough so that at the ion kinetic energies adequate to produce fusion the diameters of the looping components of the ions' motions are substantially smaller than the electric field direction spacings between the electrodes bounding the annular regions, and in most cases substantially smaller than the extent of the mixed ion and electron stream in the electric-field direction. Now note that with such patterns as to magnitudes, each ion will because of its looping motion spread its electric charge out over a distance at right angles to the magnetic field that is equal to the looping diameter. The similar spread of the charge of the electrons will be very much less, because of the greatly smaller mass and lower average energies of the electrons; at equal energies the diameter-ratio is 60 for a stream having deuterons as the ions. With this difference in extent of the charge content existing, it is evident that if in a stream the ions and electrons are in fact uniformly distributed as to densities, there will appear a positive charge layer at both of the two faces of the stream; it is to be expected that to some degree such charge layers will in fact appear, and will have effects on the potential distribution within the stream, effects which can be accounted for in the design of the stream introduction arrangements.

More generally, this inequality between the spatial spread of the charge carried by the ions and that carried by the electrons will affect all details of the relations between charge distribution and particle distribution in the space-charge waves within the stream, and so influence the shapes of the hills and valleys of potential in the space-charge waves, whose presence will influence the average rates of occurrence of elastic collisions between the ions and of collisions resulting in fusion events. Such space-charge waves are essential aspects of "instabilities" that have been the objects of very extensive research and development activities toward employing fully-ionized gases to cause useful controlled nuclear fusion. Various of the resources existing in the state of the art of such research and development can be employed to aid in confining and controlling the streams of my invention, more particularly the sources of arranging the coils to establish useful gradients in the magnetic flux density in the regions where the streams exist. In spite of the underlying basic similarity to Tokomak machines in the suggested use of toroidal geometry the principles of operation are totally different. In particular in my invention the ions are produced and given energy by ion optical means, before mixing with the electrons, so that there is no need for there occurring, as in the Tokomak machine, a strong magnetically generated transient electric field to cause ionization and initiate the enhancement of ion energy. Thus in my apparatus there need not exist at any time electric currents in the streams whose magnetic effects are comparable with those due to the main coils that provide the very strong magnetic field. Thus the spatial gradations that may be needed in the magnetic fields within the annular regions where the streams exist may be caused either by passing currents in the electrodes bounding the annular regions, or by tailoring details of coils subordinate in effects to the main coil. As mentioned earlier, some circumferential component of the magnetic field is necessary to cause the helical or quasi-helical travel of the stream from turn to turn. The poloidal type of magnetic field that results is also advantageous in aiding confinement of the stream to its desired location away from the electrode surfaces.

Random motions of the ions in directions parallel to the magnetic field are not generally harmful within the reaction region because such motions merely transfer the shifting ions from one turn of the helical motion to an adjacent one. Within the crossed-field channels used to introduce the stream into the region of strong magnetic field, and at turn-around ends of the helical tavels, it will be necessary to use "end hat" types of electrodes familiar in microwave magnetron design, except that here double end hats are used, to suppress random motions in the direction of the magnetic field that will result from elastic collisions between the ions of the stream.

It should be emphasized that because in my invention the kinetic energies needed for fusion are given to the ions before their introduction into the fusion reaction region, and the densities in the streams are governed in combination by the densities in the stream entrance channels and the crossed-field advance velocity in the fusion stream circulation, the designer and operator of the device has at his disposal the determination of both ion kinetic energy and ion density, two of the three major factors in bringing about stream attributes adequate to cause fusion at a useful rate. The third major factor, duraction of the stream under conditions of adequate energy and density, is provided by making it possible, if needed, to have the stream travel over and back many times in adjacent annular chambers. This may not be necessary, but is an available resource. Under the conditions as so stated, it will be possible to have fusion occur at high rates of power production per unit volume in the stream or streams, permitting high rates of power generation in not excessive volumes of the apparatus.

One aspect of my invention consists of provisions for using state-of-the-art means for producing ions in substantial amount outside of the region of strong magnetic field, accelerating these ions to high kinetic energies, as for example through 20,000 or more volts of accelerating potential, causing convergence of the several streams and mixing with separately produced electrons for space-charge neutralization, this convergence being produced by using a specially designed configuration of magnetic field of conventional engineering magnitudes, properly coordinated with the accelerating electric field and the electric-field component of the crossed-field channel into which the combined streams of high-kinetic energy ions and low or moderate kinetic energy electrons are introduced, this being the channel via which the mixed ion-and electron stream is passed into the region of strong magnetic field by the crossed-field resource. While in the portion of the crossed-field channel that is outside the region of very strong magnetic field it may be found convenient to have essentially all of the ion kinetic energy in the crossed-field advance motion, with the stream ion-and-electron density being relatively low because of the high crossed-field advance velocity that is possible because of the moderate value of the magnetic flux density. As the stream enters between turns of the main coil into the region of very strong magnetic field the crossed-field-advance velocity becomes immediately relatively slow, with most of the kinetic energy being in tightly looping components of the ion motions, which are, because of the strong magnetic field, small relative to the physical extent of the crossed-field entrance channel in the direction of the electric field. At the same time, because the total rate of particle transfer remains the same as in the outside the coil region, the ion and electron density becomes very much larger in view of the slower advance velocity. The path of the stream-entrance channel within the region of strong magnetic field, through its passage through the neutron-absorbing blanket, is maintained such that the electric field across the channel is always at right angles to the direction of the strong magnetic field; this can be consistent with having its path carry the stream to the required point of release of the stream into the annular fusion reaction region, in the necessary crossed-field direction. The occurrence of fusion events in the part of the channel that lies within the neutron absorbing blanket should probably be avoided, as fusion products released therein could reach the main coil without passage through the entire thickness of the blanket. By controlling the electric cross field within this part of the channel the along-the-channel crossed-field advance velocity can be controlled. Thus an increase of the crossed-field advance, with the total rate of particle passage remaining the same, reduces the particle density, which can in this way be kept below the density needed for significant production of fusion products.

An essential aspect of my invention is that the ion and electron stream is carried away from the point of release from the entrance channel at the same rate of particle flow as that of its release from the channel. This is accomplished by having the crossed-field arrangements in the annular reaction chamber carry the entering particles away in the circumferential direction around the interior of the annular reaction chamber. Thus the chamber readily accepts the stream as fast as it enters; of course the density in the stream will be made greater in the reaction chamber than in the entrance channel, by making the crossed-field advance occur more slowly, thus not only increasing the density, but putting more of the energy into the looping components, thus favoring a high collision rate as needed to encourage fusion.

In the outside-the-strong-field assembly of the ion source means and the ion accelerating means it is necessary to have the stream of ions at its convergence into the crossed-field channel have its proper potential gradient across the stream, this being necessary to give the appropriate crossed-field advance velocity within the channel. But at the same time all portions of the ion stream must have a common forward kinetic energy, which must be acquired by acceleration through a potential difference that is the same for all parts of the stream, this acceleration occuring in the ion optical system. To have this come about it is necesary that the various portions of the ion sources, or the several sources, from which the stream originates, be at progressively different potentials for the different portions of the stream, in order that after being accelerated through a common amount of potential difference the ions will all have the same forward energy yet enter the crossed-field channel at graded values of electric potential so producing the required potential gradient within the channel. All this is possible within state-of-the-art engineering practices.

A basic concept of my invention is that the ion-electron stream is to circulate along helical or quasi-helical paths within the annular fusion reaction chamber, with relatively slow travel in the along the helix axis direction, in order that the ions may remain long enough in the fusion reacting condition to produce substantial fusion energy. However, eventually the ion stream must either be terminated within the region of very strong magnetic field or brought out through an exit channel for termination outside the region of very strong magnetic field. The ions, and to a uncertain degree the electrons, will still have very considerable kinetic energies at the time and place where termination is desired, whether inside or outside the strong-field region.

By bringing the stream across flux lines to the region outside the region of very strong magnetic field, via crossed-field exit channels similar to the entrance channels, considerable freedom becomes available as to means for usefully recovering the energy. In this outside region, where the magnetic flux densities will be of conventional magnitudes, a few thousand gauss, in order to maintain the stream within the channel it is necessary for essentially all of the kinetic energy to be in the crossed-field advance velocity along the channel, for in these moderate magnetic flux densities the looping components would have undesirably large diameters if they contained a significant part of the energy. By appropriate use of MHD methods, ("magnetohydrodynamics," using crossed-field technology), it would certainly be possible to extract a large part of this kinetic energy by direct conversion into electrical form.

In my invention, in which the looping motion diameter will be small relative to fusion chamber dimensions, only the crossed-field-advance motion as due to all existing field causes, will produce major unwanted flow of particles across magnetic flux lines in the radial direction toward electrodes. To cause such flow across the flux lines of the very strong magnetic field caused by the main coil, flux lines lying parallel to the axis of the cylindrical or toroidal annular regions, an electric field would have to be in the direction of the gross-aspect crossed-field advance, that is, circumferential in the cylindrical embodiment, and circumferential around the short-dimension section in the toroidal embodiment. But such a field cannot be produced by voltages on the electrodes of the structure of my invention; it can only exist because of the presence of space charge within the stream. But space charge does not exist in the region between the stream and the electrode walls in my invention, hence one of the advantages of my invention in controlling the location of the stream.

In evaluating any approach to avoiding harmful effects of space-charge waves in tendencies they may have toward causing escape of the charged particles to the enclosing walls of a fusion chamber, it is extremely important to have clearly in mind the fact that with charged-particle densities of the magnitudes needed for controlled fusion in a fully ionized gas under magnetic field containment, being of the order of $10^{14}$ or $10^{15}$ or more ions and electrons per cubic centimeter, an extremely small inequality percentagewise, between densities of ions and electrons will give rise to extremely large electric field strengths. For example, a planar, sinuisoidally-varying space-charge wave having an amplitude of 1000 volts and a wave length of one centimeter has as its space-charge-density amplitude, i.e., greatest value, that caused by an ion-density excess over the electron density, or vice versa, of only about $2 \times 10^{10}$ per cubic centimeter. That is, at the maximum space-charge density in such a wave on the positive potential portion, the ion density exceeds the electron density by only 0.01% (one part in 10,000) of a typical fusion device plasma or stream density of $2 \times 10^{14}$ per cubic centimeter. For a 10,000-volt space-charge wave of one-centimeter wave length this would change to 0.1% (one part in 1000) of the stream of particle density $2 \times 10^{14}$. And this excess would be less for a longer wave length, varying fact inversely as the square of the wave length.

Of course such a space-charge wave has a steep potential gradient at its zero potential location, and this potential gradient causes the charged particles to have a crossed-field advance along this zero potential contour of the wave, both kinds of particles moving in the same direction. With a magnetic flux densityof 100,000 gauss, for a 10,000 volt space-charge wave at a wave length of one-half centimeter, this crossed-field advance gives a deuteron an energy due to this advance of 16,500 electron volts, which is in the range of expected ion introduction energies.

If as is to be expected, the phase velocity of advance of the space-charge wave is less or greater than the crossed-field advance of the stream as a whole, the particles overtake the wave (or vice versa), thus experiencing alternately down-slopes and up-slopes of the potential hills and valleys, so giving the guiding center short-range to-and-fro crossed-field advance motions alternately toward one and then the other edge of the stream. At stream edges, where hills and valleys end, crossed-field advance motions carry the guiding centers around the ends of th hills and valleys; thus they do not move out into the charge-free spaces toward the chamber walls. The quasi-trochoidal motions of the ions comprise a superposition of small-diameter loopings on the just described oscillations of the guiding centers. The to-and-fro oscillations occur parallel to the advancing contours of the potential hills and valleys, thus being in the cross-stream direction of the applied electric field. This is all in addition to the gross aspect crossed-field advance motion in the prime circumferential direction, carrying the stream along its short-pitch helical travel. The wave lengths of these space-charge waves will not be less than the without-the-wave diameter of the looping motion, because the loops are not likely to reach over the tops of the hills, and this agrees with the observation that the spatial periodicity of the flute instability has a similar limitation. Whatever their average energies, the electrons will move very precisely along contours of these hills and valleys, as their looping motions will be extremely small in diameter.

As the ions, at the ends of their cross-direction crossed-field advancing, turn around at the ends of the potential hills at the edges of the stream there will come into play a centrifugal force on them tending to move them out into the region between the stream and the walls of the annular chamber within which the stream circulates. As has been stated earlier, the total paths of the guiding centers can be influenced by centrifugal force effects, and this influence will appear here. In order to prevent this centrifugally caused outward movement from causing a serious tendency for ion escape from the stream, the radial electric field due to the potential applied to the bounding electrodes may be made considerably greater than the electric fields within the space-charge waves. Othewise there might be a "potential trough" extending out into the space-charge free region outside the stream, along whose sides a substantial number of guiding centers might slide toward the enclosure walls. But with adequate domination of these edge-of-the-stream electric fields by the applied fields, the charged particles will not escape to the walls.

At the very high ion densities and kinetic energies that will be required to produce in the annular reaction chambers nuclear fusion at a useful rate there will be a great many elastic collisions. Actually, the rate of such collisions should be greater in the presence of the high-energy looping components of the motion than would occur due to ordinarily conceived random motions. The most important collisions will be those between the ions, rather than between ions and electrons or between electrons and electrons. The electron mass is small enough so that at collision with an ion there is very little exchange of energy, and very little transfer of momentum to the ion. However, at ion-with-ion collisions there do occur substantial exchanges of energy and momentum, and alterations in the directions of motion of the colliding particles.

In the presence of the strong magnetic fields here envisioned ion-with-ion collisions cannot cause either colliding particle of a collision to take on a continued movement across magnetic flux lines, as would be necessary to result in escape of the ion from the stream. For if as a result of a collision an ion's motion is initially aimed across flux lines, and if it then continues around the tight loop called for by its kinetic energy and the magnetic field, it will move only a very short distance (half the loop diameter) across magnetic flux lines and will then via the looping motion return to a point actually a half-diameter from its collision point in the opposite direction from its initial motion, and eventually return to the collision location position in the magnetic field structure. No net positional change of the guiding center has resulted from the collision. If collisions interfere with progress around the loop, successive segments of loop motions will add up to give statistically the same result as an individual loop, as far as effects on guiding-center motions are concerned.

BRIEF DESCRIPTION OF THE DRAWINGS

The aforementioned objects, advantages and purposes of the invention will be more fully understood with reference to the accompanying description and drawings wherein:

FIG. 1 is a diametrical sectional view of nuclear fusion apparatus for practicing the concepts of the invention wherein the chamber is of a linear form, FIG. 2 is an elevational sectional view of the apparatus of FIG. 1 taken along Section II—II thereof, FIG. 3 is an enlarged, detailed, sectional view of a portion of the reaction chamber illustrating the arrangement of the stream-introducing channels, FIG. 4 is a schematic view of apparatus which may be used for producing the ion and electron stream prior to being introduced into the reaction chamber, FIG. 5 is an end view of electron producing apparatus as may be used with the invention, FIG. 6 is an enlarged, detailed, sectional view of the construction of a channel used to carry the stream of particles into the reaction chamber, FIG. 8 is a plan sectional view taken through Section VIII—VIII of FIG. 7.

DESCRIPTION OF THE PREFERRED EMBODIMENTS

Figure 7:
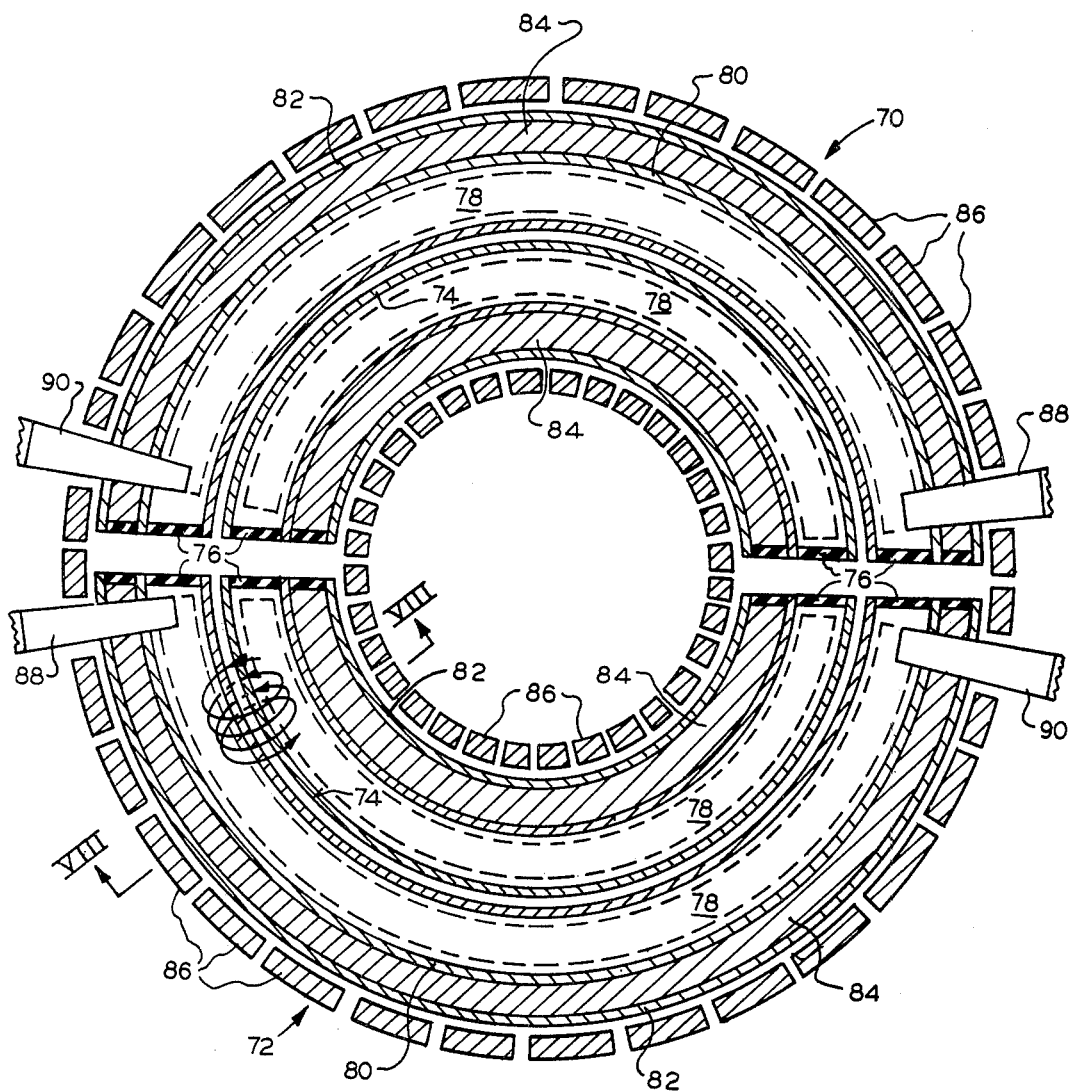
FIG. 7 is a sectional, plan view of an embodiment of apparatus in accord with the invention wherein the nuclear reaction chamber is of an arcuate form, a pair of chambers being illustrated defining a substantially circular apparatus.

As will be appreciated from the fact that several embodiments of apparatus are illustrated and described in which the concepts of the invention may be practiced, significant latitude exists in the designing of apparatus within the scope of the invention, and the apparatus illustrated and described herein is indicative of the structural relations and features considered most advisable in the practice of the invention.

FIG. 1 is an elevational, diametrical, sectional view of crossed-field nuclear fusion apparatus in which the invention may be practiced, and wherein the configuration of the reaction chamber is linear. The illustrated apparatus includes a body 10 comprising a central cylindrical core 12 and end portions 14; throughout this body there are present lithium or a lithium-bearing material which in absorbing the high kinetic energy neutrons breeds atoms of the heavy hydrogen gas tritium for subsequent use as a fusion fuel, and accepts kinetic energy, converting it to heat, which on being recovered and removed by a circulating coolant becomes useful energy. The coolant, which circulates in coils or channels 16 through this body, may be hot liquid lithium, or it may be another fluid or gas, for example helium, if the material of the body is a solid substance consisting of or containing a compound of the lithium required to breed tritium. The cylindrical core 12 is encased within the inner cylindrical electrode 18

(which might alternatively be the positive electrode). Neutron-stopping substances other than lithium may be used.

Body 10 is recessed at 20, between its end portions 14, to define the reaction chamber 22 in radial alignment with the length of the inner electrode 18, and the outer dimension of the chamber is defined by the annular cylindrical outer electrode 24 which is axially aligned with the inner electrode, and in spaced radial relationship thereto to form the chamber 22. The reaction chamber is terminated at its ends by disks 26 of electrically insulating material that fit inside the ends of the outer electrode 24 and have central openings such that the disks fit over the inner electrode 18. Vacuum pumping means, not shown, are provided to maintain an extremely high vacuum in the reaction chamber 22 so that the only gaseous substance present in significant degree is the fully ionized gas in which the fusion occurs.

A neutron absorbing "blanket" 28 of cylindrical configuration surrounds the reaction chamber 22 adjacent the outer cylindrical electrode 24. The purpose of this blanket is to prevent high-energy neutrons from reaching and causing damage to the portions of the apparatus exterior to it and the blanket is of length greater than that of the reaction chamber and of significant radial dimension. The absorption material comprising the blanket must have a maximum neutron absorption capability, as provided by the metal gadolinium, in order to keep the overall outer diameter of the apparatus as small as possible. Fluid cooling and recirculation conduits also exist within the blanket 28, to recover and remove as useful heat the kinetic energy generated in the absorption of the neutrons.

A thermal insulating material 30 surrounds the neutron absorption blanket 28, and an electric coil 32 is wound upon the insulation 30.

A negative electrical potential is imposed upon the inner cylindrical electrode 18, while a positive electrical potential is connected to the outer electrode 24, or alternatively, these electrical polarities might be interchanged; the difference in the potentials between the electrodes 18 and 24 is several tens of thousands of volts. Thus, a strong and essentially radial electric field will exist within the nuclear reaction chamber 22.

The coil 32 is also connected to an electric supply source wherein the coil will produce a very strong magnetic field within the chamber 22 having paths of magnetic flux which are at right angles to the electric field direction producing strong crossed electric and magnetic fields within the reaction chamber. The lines or tubes of magnetic flux are generally parallel to the axis of symmetry of the structure, within the reaction chamber 22.

As shown by the arrows in FIG. 1, the stream of fusible ions and space charge-neutralizing electrons circulates generally circumferentially and is confined within the chamber 22 intermediate the electrodes 18 and 24. If the fusion reactions are such as to produce significant charged particle fusion products, as for example the deuterium-deuterium reaction and the lithium and boron-11 reaction, and the inner electrode is negative, the circulating stream would preferably be located closer to the more negative inner electrode than to the other positive electrode 24, as then positively charged fusion products originating within the stream and moving outwardly will penetrate against a substantially larger voltage than those moving inward will pass through, and since their initial generation will be random there will be a net direct electric power generation. Also, for such reactions resulting in positively charged fusion products, the ion and electron stream can be introduced and maintained, at a range of electric potentials substantially lower than the potentials of either of the two electrodes, so that all such positively charged fusion caused particles will, after production, move to one or the other electrode against a substantial electric potential, thus causing direct generation of electric power, as well as producing usable heat by being stopped at the electrode surfaces. For such positively charged particles do not penetrate through the electrodes to cause damage farther on, in contrast to neutrons which readily penetrate the electrodes and must be absorbed farther on.

The stream of fusionable ions and space charge neutralizing electrons circulating within the chamber 22 are preferably introduced into the chamber by a plurality of channels 34, FIGS. 2 and 3, each channel having an outlet 36 substantially tangentially related to the nuclear reaction chamber 22. As later described, the channel outlets 36 are oriented in a circumferential or tangential direction in order to aid the entrance of the particles into the strong crossed electric and magnetic fields within the chamber, in that with this orientation of the outlet the charged particles emerge already moving under the crossed field influence within the channel in the direction of the circulation within the reaction chamber.

Preferably, the channels 34 are each of a rectangular cross sectional configuration, as will be apparent from FIG. 6, having edge portions 38 formed of an insulating material. One of the elongated channel sides, as indicated at 40, is constructed in the form of a negative electrode, while the diametrically opposite elongated channel side 42 constitutes a positive electrode. Conductors, not shown, are connected to the channel wall electrodes whereby suitable polarities are imposed thereon.

When, as in FIG. 3, a plurality of channels 34 is used, the channel side having the more negative potential, of any of the channels, will be at essentially the same potential as the channel side having the more positive potential of the adjacent channel inward from it, for the case where the outer fusion chamber electrode is the positive one. Thus there is established at stream outlet from the channels a potential gradient across the entire combination of streams, corresponding to the potential gradient required to produce the parallel-to-one-another crossed field advance circulation of the several streams. This sequence of potentials, and the potentials on the inner and outer electrodes, and other needed electrical provisions, will be such as to cause there to exist a strong essentially radial electric field in the region between the outer electrode 24 and the outer face of the outer stream, and a similarly strong radial electric field between the inner electrode 18 and the inner face of the inner stream. These strong radial electric fields between the electrodes and the faces of the streams well separated from them serve very important functions in the confining of the streams to their loctions of origin at the outlets from the entrance channels.

Adjacent each edge 38 of the channel, and within the confines thereof, are located a pair of spaced wire or tubular grids 44. The inner grids or tubes 46 are provided with potentials positive to the potentials of the nearest adjacent stream region, in order to reverse random motions of ions causing the ions to be repelled back into the flowing stream of ions and electrons. A negatively charged grid 48 is also located in each channel end region, beyond the positively charged grid array, with grid wires given potentials negative to the potentials of the nearest adjacent stream, to repel electrons endeavoring to escape from the stream which have passed through the inner grid 46, causing the electrons to move back into the stream. The actual design details of these grids or arrays of tubes, and choices for voltages applied to the several grid wires or tubes, will depend on design details of the ion and electron stream passing along the channel, including matters of division of ion kinetic energy as between the crossed field advance velocity along the stream and other components of their motions, the kinetic energies of the electrons, collision rates with the stream as affected by particles densities, energies, and types of ions.

FIG. 4 schematically illustrates the formation of the stream 50 of fusible ions and space charge neutralizing electrons injected into the nuclear fusion chamber 22. In producing this stream of particles it is necessary that the high energy ions have a high particle density as they enter into the circulation within the fusion chamber, and the ions must be accelerated to high values of kinetic energy before entering the entrance channel where they mix with electrons.

The ions are generated by an ion source, actually ten separate ion sources, schematically represented at 52, which includes a grid 54 through which the ions pass, free of electrons. Various state-of-the-art sources exist that are adequate for use in this invention; all of them involve producing a gaseous conducting plasms at far below atmospheric pressures in which ionization results from the passage of electric current, in the form of a flow of electrons, between a positive and a negative electrode, and with use of a grid structure, possibly a multiple-grid structure, at one face of the plasma enclosure that encourages ion emergence while preventing electron emergence. One such ion source that has been used successfully in research toward controlled nuclear fusion employs a multiplicity of hot filaments to provide the electrons whose acceleration by the plasma entrance fields gives them requisite ionizing energy. In another type of ion source the ions are drawn electrically from magnetically collimated arcs in the appropriate gas, as for example deuterium gas. Whatever the particular ion source, the ion stream is accelerated to the desired kinetic energy of from 10,000 to 20,000, or perhaps more, electron volts by passage through the requisite accelerating fields assigned by state-of-the-art ion optical methods, and thence pass adjacent a plurality of electron sources 56 located at the entrance to the crossed field channels 34, with parallel to one another joining of ion streams from different ion sources at successfully different potentials, so that after being accelerated to a common kinetic energy of forward motion they will form a stream having a potential gradient as desired to produce the cross-field advance within the channel. As shown in FIG. 5, the electron sources 56 can consist of a plurality of charged hot filaments 58 and associated accelerating grids 59 wherein the electrons emerge from these sources at kinetic energies of a few hundred electron volts prior to merging with the passing ion stream thus providing the space charge neutralization for the stream.

As represented by dotted line 62, the region in which the ions and electrons merge, is subjected to a magnetic field of conventional strength in engineering apparatus, being several thousand gauss, and as the stream of ions and electrons moves into and through the channel 34 the stream will be confirmed within appropriate boundaries, not reaching the edges of the channel, by the circumstances of its introduction into the channel, in particular the potentials of the stream portions at their locations of merging and channel entrance, as governed by accelerating grids 60 and the ion and electron optics of the stream environments.

With reference to FIG. 1, a stream exit channel 64 communicates with the right end of the chamber 22, whereby the circulating stream of particles may be removed from the chamber after passing therethrough, or there may be at that location a plurality of such channels 64, comparable with the use of a plurality of entrance channels 34. The exit channels 64 may consist of a rectangular channel construction as shown in FIG. 6, having an entrance for receiving the ions and electrons which have reached the right end of the reaction chamber; if there are several channels their several potentials are maintained at the potentials corresponding to the portions of the stream they are to receive.

In the preferred embodiment the ions and electrons pass through the injection channels 34 at a very high total kinetic energy of the ions, imparted to the ions by the ion optical system outside the region of the very strong magnetic field of the reaction chamber. Each channel stream contains space charge neutralizing electrons at a density equal to that of the ions. The electrons' energies must be high enough to prevent any significant recombination with the ions to create neutral gas particles, but the electrons will initially be introduced into the stream with kinetic energies very much lower than those of the ions. As the crossed-field advance velocity of the electrons is the same as that of the ions, the two kinds of particles will pass through the channels at equal rates, carrying equal and opposite electric currents, so that the net current is zero in each injection channel.

It is the intent that for the portion of the injection channel 34 that lies within the strong magnetic field, passing through the neutron-absorption blanket 28 and at the point of orientation for proper delivery of the stream into the reaction chamber, the major portion of the kinetic energy of the ions will be in the sloping components of the tightly-looping trochoidal or quasi-trochoidal motions characteristic of charged particle advance when the kinetic energy corresponding to the crossed field advance velocity is a small fraction of the particle's total kinetic energy. The cross sectional extent of the channel, in the direction of the applied electric field, is made large enough so that the radius of the looping component is a small to moderate fraction of the extent of the channel in this direction, and so also to the channel extent, at the existing values of ion energies, magnetic field strength, and potential gradient in the stream.

In the portion of the injection channel that lies outside the region of very strong magnetic field, where the magnetic flux density is relatively low, being a few thousand gauss, the crossed field advance velocity is high, with essentially all of the kinetic energy of the ions being in the crossed field advance velocity. Thus the kinetic energy in the looping component of the ion motion is very small, so that the departure from straight line motion along the channel is trivial. Where the channel passes between the turns of the main coil 32, it is exposed to an extremely steep increasing gradient in the magnetic flux density. By properly relating the geometry and dimensions of the channel to the voltage thereacross in the region of this steep gradient, the transition of the motion of the ions of the stream from essentially straight line advance motion to a much slower tightly looping motion can be accomplished without harmful enlargement of the stream cross section.

As an example, at a strong magnetic field flux density of 200,000 gauss and an electric field strength of 10,000 volts per centimeter within the stream of charged particles in the portion of the channel 34 inside the main coil 32, the guiding centers of both kinds of particles have a crossed field advance velocity along the channel of $10^6$ volts per meter divided by 20 webers per square meter, giving 50,000 meters per second as this advance velocity along the channel. For deuterons, with an ion-to-electron mass ratio of 3669, the square root being 60.6, this gives a kinetic energy content in the crossed-field advance velocity of 26 electron volts. If the total kinetic energy per ion, given in its ion optical acceleration, is 20,000 electron volts per deuteron, an acceptable order of magnitude for fusion, this leaves substantially all of the kinetic energy in the looping component of the motion in this within-the-main-coil portion of the entrance channel. For deuterons the radius of the looping component of the motion at this kinetic energy and in this magnetic field is 1.44 millimeters. It is desirable to have the ion and electron density lower in this portion of the entrance channel than in the streams within the reaction chamber, both to avoid occurrence of fusion before passage through the neutron blanket is completed, and as an aid to controlling random motion movement of the charged particles in the magnetic field direction toward the ends where their escape is prevented by the grids 44. At an illustratively desirable ion and electron density of $2 \times 10^{13}$ per cubic centimeter in this within the main coil portion of the entrance channel, the current flow carried by the ions is $2 \times 10^{19}$ per cubic meter multiplied by 50,000 meters per second to give $10^{24}$ ions and electrons flowing along the stream per square meter per second; at $1.6 \times 10^{-19}$ coulomb per ion this is $1.6 \times 10^5$ amperes per square meter, or 16 amperes per square centimeter, of current carried along th channel by the ions, with an equal and opposite current carried by the negatively charged electrons, the net current in the channel being zero.

At the point of injection into the circulating stream within the nuclear reaction chamber 22, with a plurality of channels 34 being used, the several channels will have differing average electric potentials. For the design in which the outer electrode 24 of the reaction chamber is the positive electrode, the channel 34 having the outermost radial position will be at the higher potential, the next one somewhat less positive, and so on. Also, as described elsewhere, within each channel's stream as it exits from the channel outlet 36 there is a potential gradient with the potential declining inwardly for this example. Thus as the several streams enter the reaction chamber 22 there appears in this annular chamber a radial potential distribution generally declining from a highest value at the outer electrode, which is at a potential substantially higher than that at the side of the outermost stream, to a lesser value at the inner electrode 18, which would be in this illustration at a potential substantially lower than that at the side of the innermost stream. There will be a considerable radial distance between the outer side of the stream 50 and the outer electrode 24, and similarly a considerable radial distance between the inner side of the stream 50 and the inner electrode 18; however, there need be no separation radially between the several stream of channels 34 after they enter the nuclear reaction chamber 22 and begin their circumferential circulation at right angles to both the magnetic field and the applied electric field. This illustrates a basic aspect of the invention, i.e., establishing the potential distribution within the stream at stream entry by design and operation of the apparatus, and maintaining this potential distrubution during the circulation within the reaction chamber, if necessary by control of charge distribution at or beyond stream edges, as for example by circulating streams of electrons outside the main stream or streams.

By establishing and maintaining a potential distribution in which the potential gradient is less steep within the inner stream 66, FIG. 3, than within the outer stream 68, the crossed field circulational advance of the inner stream can be made slower than that in the outer stream so that time for circulation around the smaller inner stream path be made the same as for that around the longer outer stream path.

Confinement of the stream of particles within the entrance channels 34 may be understood in terms of ion-optical perceptions which indicate the field forces exist that compel motion to be in the cross-field direction, with but little departure therefrom if the channel parameters are properly designed, or one can think in terms of "magnetic pressure," the concept being that the charged particles can cross magnetic flux lines only to a very limited extent in the absence of electric fields in the direction of the longer cross sectional dimension of the channel. Such fields do not exist outside of the ion and electron streams. The same considerations apply to the continuing existence of circumferential streams after emergence from the entrance channels 34 into the circulating streams in the reaction chamber.

As to the circumferential circulation within the annular reaction chamber 22, provisions are made to assure that the stream 50 during each circulation around a circumferential path shifts axially to a limited extent in the direction of the magnetic field provided by the main coil 32, to provide an advancing of the stream circulation in that direction. Thus, the total path within the reaction chamber will correspond to a helix with a pitch small relative to its diameter and with the axis of the helix being the same as the axis common to the two electrodes 18 and 24; thus these helical paths of the charged particles' guiding centers lie in the annular region between the two electrodes and are concentric with the cylindrical shapes of those electrodes. This advance from turn to turn around the helical paths is provided by giving the magnetic field a small circumferential component. This can be accomplished in the disclosed embodiment by passing a direct current of appropriate strength along the length of the inner electrode 18 in the opposite direction to the small axial component of the current in the main coil 32 that produces the strong magnetic field. The combination of this circumferential component of the magnetic field with the basic strong field parallel to the axis of the electrodes is called a "poloidal" magnetic field.

A variation in the apparatus wherein the invention concepts of the invention may be practised is shown in FIG. 7, wherein the apparatus is in the form of a two part toroid. Preferably, when the apparatus is in the form of a toroid it would comprise a complete toroid wherein an annular reaction chamber between two toroidal electrodes exists, whereby the stream of particles may continually move along curved axis helical paths about a 360° elongated circuit of the helical axis. However, because of the need to support the inner electrodes such a construction is not practical. In FIG. 7 the two halves of the toroid are designated by the reference numerals 70 and 72, and are identical in construction and identical numeral references are utilized in the description thereof.

The apparatus portions 70 and 72 include an arcuate inner small diameter tubular electrode 74 which is of substantially a 180° configuration, and at its end is mounted upon the insulating-material mounting plates 76 radially disposed with respect to the general configuration of the apparatus. The tubular electrode 74 may be positively charged, and an annular reaction chamber 78 is defined by this electrode and the outer negatively charged tubular electrode 80 circumscribing the inner electrode. The outer electrode is also mounted on the plates 76. Alternatively, the inner electrode may be negatively charged and the outer electrode positively charged, as the basic requirement is that there exist between them a strong applied electric field having a direction radial to the circular axis common to the two electrodes.

The outer confines of the apparatus are defined by the tubular housing 82, which is of considerably larger diameter than the outer electrode 80 wherein an annular radial space exists between the housing and the outer electrode, which is filled with a high neutron absorbing material 84, as for example gadolinium and containing circulating conduits, not shown, for removing therefrom the heat resulting from stopping the high-energy neutrons. The circulation removes the heat as useful output, or there can be provisions to circulate hot liquid lithium in this space, to breed tritium as well as accepting the kinetic energy of the neutrons and converting it to heat removed by the circulation to become useful energy. Or there can be used a solid substance consisting of or containing lithium to serve to breed tritium gas, with a liquid or a gas, for example helium, circulating as the coolant to remove and provide utility from the heat, and to remove the tritium gas as it is bred.

Magnetic coils 86 encompass the housing 82 for producing the desired strong magnetic field within the reaction chamber between electrodes 74 and 80.

The entrance channels 88 for introducing the stream of high kinetic energy fusible ions and space charge neutralizing electrons are located adjacent the plates 76, and exiting channels 90 are located at the opposite ends of the reaction chamber for permitting the particles to be removed therefrom. Preferably, the stream of ions and electrons is introduced into the reaction chamber 78 by a plurality of entrance channels 88 as described with respect to FIGS. 1–3, and the operation of the apparatus of FIG. 7 is functionally similar to that as described with respect to FIG. 1. Of course, it will be appreciated that the advantage of the toroid construction of FIG. 7 lies in the ability to locate a relatively long chamber in a minimum of space and there is also the advantage that with the toroidal shape of the coil producing the strong magnetic field there exists an absolute minimum of stray magnetic field outside the outer housing. The circular toroid configuration is particularly suitable for using apparatus of this type in cylindrical housings such as rocket engines and the like.

Figure 9:
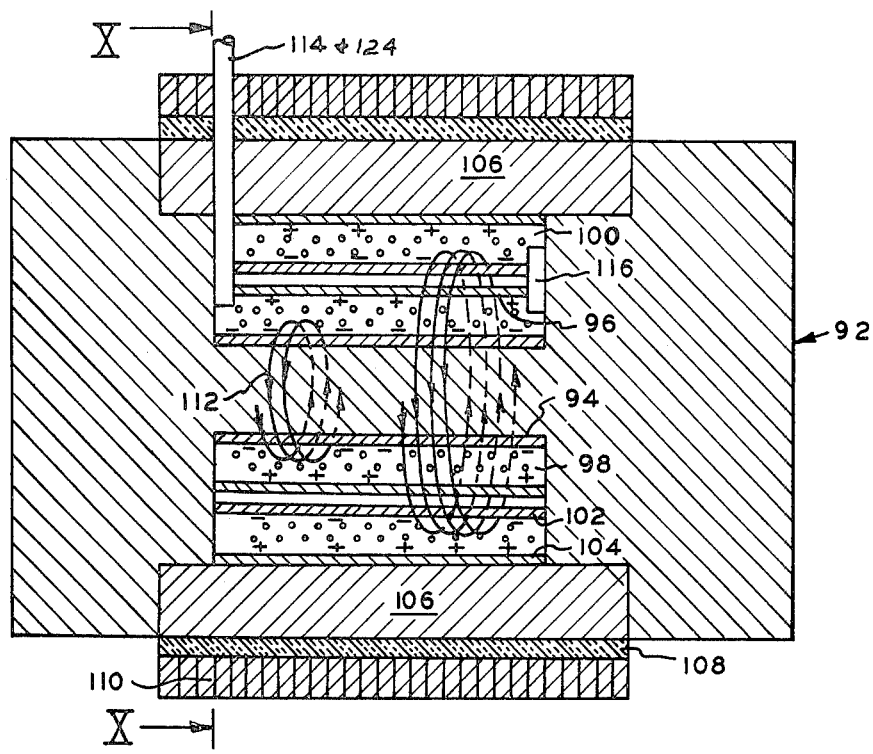
FIG. 9 is an elevational diametrical sectional view taken through another embodiment of nuclear fusion apparatus in accord with the invention illustrating apparatus for recycling the particle stream movement between concentric chambers.
Figure 10:
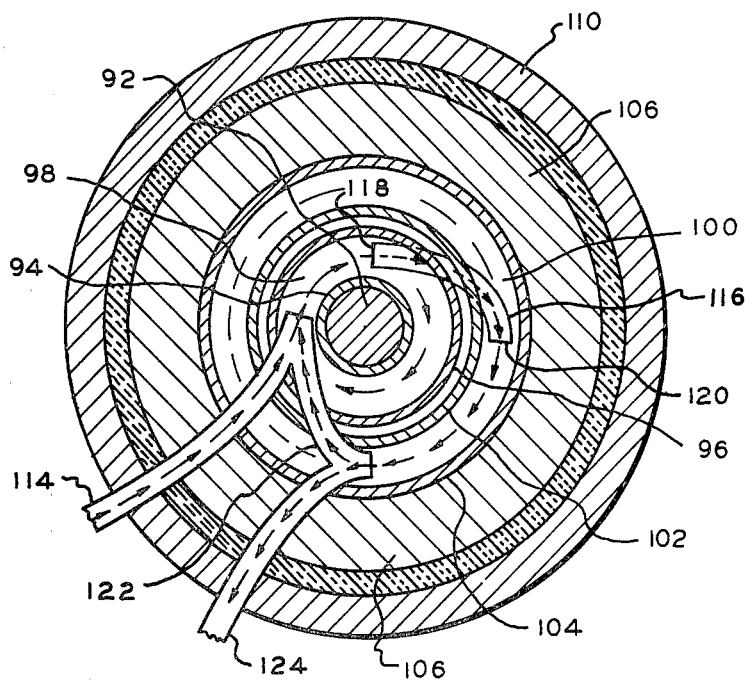
FIG. 10 is a sectional view of the apparatus of FIG. 9 taken along Section X—X thereof.

In FIGS. 9 and 10 another embodiment of apparatus for producing nuclear fusion in accord with the inventive concepts is illustrated. In this embodiment the apparatus is of such construction as to permit the traveling streams of high kinetic energy fusionable ions and space charge neutralizing electrons to be recirculated through a pair of nuclear reaction chambers wherein the time of persistence of the stream may be prolonged indefinitely, and the ion density may be progressively increased, and the rate and duration of neutron generation elevated with respect to prior described apparatus.

The apparatus illustrated in FIGS. 9 and 10 is of a linear configuration wherein annular reaction chambers have an elongated linear axis, as in the embodiment of FIG. 1, and it will be appreciated that there are a number of structural similarities between the embodiment of FIG. 1 and that of FIGS. 9 and 10. The body 92 is formed of a material which provides absorption of neutrons and breeding of tritium gas using lithium, and the body includes internal conduits or channels, not shown, for circulation for the purpose of removing therefrom the heat generated by the stopping of the neutrons and the removal of the tritium gas resulting from the breeding. The circulant might be hot liquid lithium, or in the case of use of a solid substance containing lithium or a lithium compound for tritium breeding, the circulant might be some other liquid or gas, for example helium gas. Centrally, the body is of a reduced cylindrical configuration surrounded by the inner negative electrode 94. A cylindrical positive electrode 96 of tubular configuration circumscribing electrode 94 in radially spaced relationship thereto defining an annular inner nuclear reaction chamber 98. A second outer annular nuclear reaction chamber 100 is defined in radial alignment with the chamber 98 by an annular cylindrical negative electrode 102 disposed adjacent electrode 96, and an annular outer cylindrical positive electrode 104 in spaced relationship to electrode 102 defines the outer confines of the outer reaction chamber 100. As the outer electrode 96 of the inner chamber 98 and the adjacent inner electrode 102 of the outer chamber 100 may be at very different electric potentials, electrical insulation must be provided between them. An alternative design might be one in which for both reaction chambers the outer electrodes are electrically positive, and the inner ones negative, or even a design in which for one chamber the outer electrode is positive relative to the inner, and for the other chamber the outer electrode is negative relative to the inner; any of these arrangements would provide the requisite radial electric fields in both chambers.

Both of the chambers 98 and 100 are circumscribed by the cylindrical annular blanket of material 106, having high neutron-absorbing characterstics, such as gadolinium, and the blanket contains cooling conduits, not shown, for remvoing and usefully employing the heat therefrom generated by the stopping and absorption of the neutrons.

The thickness required in the neutron absorbing blanket, and the need for tritium breeding in the inner core body 10 of FIG. 1 and 92 of FIGS. 9 and 10, also the need for tritium breeding and the thickness of the absorbing blanket 84 of the FIG. 7 embodiment, depend on the types of fusionable ions used in the reaction chamber. The embodiments here presented, emphasizing tritium breeding and a relatively thick blanket to protect the main coil from damage by exposure to neutrons, are described primarily with reference to the use of a mixture, in nearly equal proportions, of tritium and deuterium as the materials from which the ions are formed. Conceivably also there might be employed lithium and "boron 11" for which the fusion results only in the production of positively charged particles, no neutrons at all. The positively charged particles cannot penetrate the electrodes to pass beyond them into the main coil; therefore no neutron-absorbing blanket would be required, although the cooling of the metal surfaces where the high-energy charged particles are stopped becomes necessary; in principle, also, some of the energy can be recovered by direct electrical conversion resulting from penetration of the positively charged particles against a substantial potential. By the use of such materials that would greatly lessen the thickness of the neutron absorbing blanket, or possibly even eliminate it, the size required of the apparatus can be greatly reduced, and the demands for providing excitation of the strong magnetic field also greatly reduced, because of the lessened volume in which the strong magnetic field must be produced.

Because of these reasons, the possibility of using the embodiment of FIG. 9 in a nuclear-fusion engine for space vehicle propulsion is attractive, in that with no requirement for tritium breeding the dimensions can become small, and for the space environment the existence of the extensive stray field of the linear configuration would be of less significance as a practical matter than for earth-bound applications. Such an application would become attractive in view of the capabilities of this invention for controlling the kinetic energies and densities of the ions of the stream rather straight-forwardly up to high values, and in the recirculating mode of FIGS. 9 and 10 to have the ions remain in the active state for long periods of time.

With reference to FIGS. 9 and 10, a thermal insulation material 108 surrounds the neutron absorbing blanket 106, and the electric coil 110 is wound upon the insulation for providing a strong magnetic field within the chambers 98 and 100.

A stream 112 of high kinetic energy fusible ions and space charge neutralizing electrons is introduced into the inner chamber 98 by channel 114, and the particles of the stream are generated in a manner identical to that previously described. The particles introduced into the left end of the inner chamber 98, FIG. 9, will move about the inner electrode 94, and move with helical travel toward the right. It is desired that the stream of ions and electrons be transferred from the inne chamber 98 to the outer chamber 100 adjacent the right end of the chamber 98, and for this purpose a transfer channel 116 or a plurality of transfer channels, establishes communication between the right ends of chambers. The transfer channel 116 is of a rectangular cross sectional configuration identical to that shown in FIG. 6, but is of an arcuate longitudinal shape, FIG. 10, and includes a tangential inlet end 118 for receiving the stream of particles within the chamber 98, and an outlet end 120 whereby the stream of particles is tangentially introduced into the chamber 100; in the transfer channel the particles of the stream have their guiding centers constrained by the requirement for crossed field advance to move while within the chamber from the point where they enter it from one chamber to where they exit into the other; the transfer channel is a crossed-field channel.

The electric potential and the circumferential component of the magnetic field are such as to cause the stream of ions and electrons introduced into the right end of the chamber 100 to move toward the left end, and as will be noted in FIG. 9, a second crossed field transfer channel 122 is located at the left end of the chambers 98 and 100, establishing communication therebetween whereby particles within chamber 100 may be transferred inwardly into the chamber 98, and the travel cycle of the particles repeated. The channel 122 is of similar construction to channel 116, and is of a construction identical to FIG. 6, being a crossed field transfer channel, including a tangential inlet end within outer chamber 100, and a tangential exit end within chamber 98.

The apparatus also includes a crossed field stream exit channel 124 disposed adjacent the entrance channel 114, and the exit channel is located adjacent the left end of the outer reaction chamber 100 whereby stream particles may be removed from the outer chamber as desired. The channels 114 and 124 merge into channel 122 to tangentially introduce and receive the stream particles. Thus, by controlling the rate at which particles exit the chamber 100, and the rate at which they enter the inner chamber 98, the density of particles within the stream 112 recirculating within the chambers can be regulated. The control of the particle flow through the various channels is controlled by electric potentials and other known means.

The apparatus of the invention may be operated by introducing a stream of high kinetic energy fusible ions and space charge neutralizing electrons into the chamber 98 via entrance channels 114 for a sufficient time to permit particles to "fill" the chambers 98 and 100, and after the time that the chambers are filled the entrance of stream particles terminates and the stream continues to recycle through chambers 98 and 100, and no exiting of stream particles via the exit channel 124 occurs. However, if desired, during the recirculation of the stream, even though the stream is dispersed throughout both chambers, additional high kinetic energy ions and space charge neutralizing electrons may be introduced into the chambers via channels 114.

It is possible after a desired portion of the stream exits through the exit channel 124, to substantially linearize the motion and then pass the stream through apparatus of a magnetohydrodynamic nature which will recover into electrical form a large part of the kinetic energy contained in the motions of the ions that have exited.

Just as FIG. 7 illustrated an embodiment using toroidal geometry of the method and designs and operational functioning as described for FIG. 1, so there can be a toroidal embodiment of the recirculational method and designs and operational functioning as in FIGS. 9 and 10. Thus in such an embodiment there are two pairs of chambers, each 180° semicircular in extent, thus together completing the 360°, of toroidal design annular reaction chambers, one entirely enclosing the other, and each with a toroidally designed outer electrode and inner electrode at opposite potentials. The stream circulation would be in basically helical form within one of these around a helix whose axis is bent to form a semicircle, to the end of this channel where it meets the mounting plates; then by a crossed field transfer channel the stream is transferred to the other reaction chamber where its travel brings it back to near the mounting plate where the entrance channel is located. The reversing of the direction of travel is due to reversal of the circumferential component of the magnetic field, and this is accomplished by proper choice of magnitudes and directions of current passage in the chamber-bounding electrodes along their semicircular lengths.

In the foregoing description the movement of the ions within the annular reaction chamber is described as being of a tightly-looping quasi-trochoidal type. This phraseology is used to describe the looping action of the ions resulting from the fact that the kinetic energy in the small diameter looping components of the ion motions greatly exceeds the energy in the relatively slow crossed field advance motion. The kinetic energy in the looping component of the troichoidal motion is at least ten times greater than the kinetic energy in the crossed field advance motion, and as used in this description, the tightly looping quasi-trochoidal motion is to be understood in this context. Of course, the "tighter" the loops of the ion movement the greater the frequency of collisions of particles within the reaction chamber, and higher energy ratios than ten are of advantage. However, the concepts of the invention are present with an energy ratio of ten, and the phraseology employed in this description, and the claims, is to be understood to include the energy ratio of ten to one in respect to the ion movement.

The high kinetic energy ions are given their energy before introduction into the annular reaction chamber which has a primarily axial strong magnetic field and an essentially radial electric field, and the ions assume in the reaction chamber a tightly looping quasi-trochiodal type of motion. The likelihood of fusion collisions occuring is significant in that the looping movement of the ion motions exceeds, at least by a factor of ten, and to factors of tens or tens of thousands, or more, the kinetic energies in the relatively slow crossed field advance motions with which the ions circulate circumferentially around the axis of the reaction chamber, and this motion of the ions distinguishes over prior fusion approaches. The word "quasi" as employed in defining a quasi-trochoidal ion motion signifies that the trajectories are trochoidal motions relative to guiding centers whose paths are arcuate rather than being along straight lines.

The novel aspects of the invention include the introduction of the energetic ions into the reaction chamber as ions, with space-charge neutralization occuring by incorporating electrons into the stream as free electrons subsequent to giving the ions their energy. Further advantages result from the employment in the reaction chamber, by crossed field means, of the trochoidal motion of the ions in which the kinetic energy in the looping motion greatly exceeds that in the crossed field advance motion.

Further distinction of the invention over known devices exists in the introduction into and retention of the ion and electron stream within a radially delimited region substantially separated from both walls of the reaction chamber providing a substantial confinement in spite of the presence of space-charge waves in the stream. Additionally, the provision, by means of the crossed field advance of the guiding centers along helical paths due to the slight poloidal component of the magnetic field for a continuous and controllable rate of flow of the ion and electron stream into, through and out of the reaction region, including provision for continuous recirculation through the chambers and return to the first chamber also provides a continuous operation not heretofore known.

The disclosed method and apparatus make it possible for the operator of the equipment to determine independently of one another the three critical attributes of a magnetically confined stream of ions and electrons, namely, the average ion energy; the density of the charged particles in the stream; and the time of exposure of the ions to the conditions favorable to fusion.

It is appreciated that various modifications to the inventive concepts may be apparent to those given the art without departing from the spirit and scope of the invention.

I claim:

1. A method of producing and confining a stream of fusible ions at values of density and average kinetic energy such that fusion events will release energy, comprising the steps of producing a strong magnetic field in a highly evacuated region having a strong electric field primarily at right angles to the direction of the magnetic field, forming a stream of high kinetic energy fusionable ions and space-charge neutralizing electrons moving in a direcion at right angels to both fields in the region of crossed electric and magnetic fields, introducing said stream at high velocity into said strong magnetic and electric fields transverse to the magnetic field direction between suitably chosen equipotentials within said strong electric field with resulting confinement at right angles thereto whereby said stream assumes a confined looping trochoidal motion wherein the kinetic energy of the small diameter looping of ions is at least 10 times greater than the kinetic energy of the ions due to slow crossed field advance and the stream includes a guiding center following an arcuate path and achieves a high density and energy adequate to produce fusion events with resulting release of high kinetic energy neutrons and positively charged particles, delivering the kinetic energy of the particles to an energy use means, and removing the advancing stream particles after sufficient stream passage.

2. The method of producing and confining a stream of fusionable ions as in claim 1 including the step of forming said stream of high kinetic energy fusionable ions by sequentially forming a high kinetic energy ion stream, passing said ion stream through an electron source to form a mixed stream of ions and electrons, and introducing said mixed stream into a channel having crossed electric and magnetic fields, said channel introducing said stream into said strong magnetic and electric fields.

3. The method of producing and confining a stream of fusionable ions as in claim 1 wherein said electric field has a variable potential thereacross, said stream comprising a plurality of streams of high kinetic energy fusionable ions and space-charge neutralizing electrons, said streams having a different average potentials and introduced into said crossed electric and magnetic fields at distinct equipotential locations.

4. Apparatus for confining a stream of fusionable ions during a fusion reaction within an evacuated chamber comprising in combination, an inner elongated annular electrode, an annular elongated outer electrode encompassing said inner electrode and radially spaced therefrom, an annular elongated chamber defined intermediate said electrodes, means imposing electric potentials of opposite polarity on said electrodes producing a strong electric field within said chamber, an electric coil encompassing said outer electrode producing a strong magnetic field within said chamber in the elongated direction of said chamber, a stream entrance region and a stream exit region defined in said chamber, said regions being axially spaced relative to one another within said chamber, means for introducing a moving stream of high kinetic energy fusionable ions and space-charge neutralizing electrons into said chamber at high velocity at right angles to said electric and magnetic fields whereby said stream assumes a confined looping trochoidal motion wherein the kinetic energy of the small diameter looping of ions at least 10 times greater than the kinetic energy of the ions due to slow crossed field advance, the stream moving in a helical movement toward said exit region, stream removal means defined at said exit region for removing said stream from said chamber, and high kinetic energy neutron and charged particle absorbing means encompassing said chamber absorbing the energy of neutrons and charged particles released from said stream wherein the kinetic energy of said particles may be utilized in energy use means.

5. Apparatus for confining a stream of fusionable ions as in claim 4 wherein said neutron and charged particle-absorbing means comprises an annular jacket encompassing said outer electrode.

6. Apparatus for confining a stream of fusionble ions as in claim 4 wherein said means for introducing said stream of ions and electrons into said chamber entrance region includes a plurality of channels, each of said channels having an outlet, electric field producing means associated with each channel imparting an electric potential to the stream of ions and electrons passing therethrough, said channel outlets being located within said chamber at a location of electric field potentials substantially equal to the potential of the stream ejected from the associated channel outlet.

7. Apparatus for confining a stream of fusionable ions as in claim 4 wherein said electrodes and chamber are of a linear configuration.

8. Apparatus for confining a stream of fusionable ions as in claim 4 wherein said electrodes and chamber are of an arcuate configuration defining approximately 180 degrees of a cirlce and having first and second ends, said stream entrance region being at said chamber second end.

* * * * *